Patented June 11, 1940

2,204,064

UNITED STATES PATENT OFFICE 2,204,064

EQUINE ENCEPHALOMYELITIS VACCINE

Joseph W. Beard, Durham, N. C.

No Drawing. Application May 13, 1938,
Serial No. 207,685

6 Claims. (Cl. 167—78)

This invention relates to equine encephalomyelitis vaccine (either eastern or western strain) and to methods of preparing the same.

In the past, vaccines for practical use in the immunization of horses against equine encephalomyelitis have been prepared from diseased horse brains containing the virus. These vaccines, however, leave much to be desired because of the low content and variable concentration of the virus as produced in horse brains.

The virus of equine encephalomyelitis has been grown also in chick embryos.

I have discovered that I may obtain a highly effective vaccine in substantial quantities from equine encephalomyelitis virus that has been propagated in the living tissues of fowl embryo. By my process the virus so produced is inactivated to yield a vaccine on a scale sufficiently large for commercial distribution for the vaccination of horses, for instance, against natural infection from the disease.

The following specific example given by way of illustration and not in limitation describes one specific method of preparing my vaccine.

Fertile chicken eggs are incubated in an incubator or warm room at such a temperature and under such conditions that the embryo will develop normally. This temperature is usually about 103° F. When the eggs have been incubated for ten days, an opening is made in the shell with a grinder or by some other suitable means. A small amount of the virus-containing material or inoculum is introduced through the opening onto the chorio-allantoic membrane of the embryo. The shell is then sealed with a cover glass or other means and the egg is returned to the incubator. Obviously the inoculation is carried out in such a manner as not to interfere with the development of the chick.

The eggs containing the inoculated embryos are left in the incubator until just before they die, usually about thirteen hours after inoculation. Infection of the embryo by inoculation is practically always followed by the death of the embryo if it is permitted to remain in the incubator for a sufficient period of time. By watching the embryo, however, it is possible to predict to within a few minutes of when it will die as indicated by the slowing movement of the embryo.

In order to obtain the maximum yield of virus and vaccine, the embryos are removed from the shells as near as possible to the time just before they are to die. The removed embryos are immediately chilled, and then ground in some manner in order to make thorough extraction of the embryo tissues possible, the mixture of solid and liquid obtained by grinding the embryo being referred to as ground embryo sap. Thus the embryos may be ground up with sand in any suitable device. The ground embryo sap is then diluted or suspended in 0.9 per cent sodium chloride solution to a 20 per cent suspension based on the original weight of the embryos. To the 20 per cent suspension of embryo sap an equal volume of 0.8 per cent formalin solution prepared in 0.9 per cent sodium chloride solution is added yielding a final concentration of 0.4 per cent formalin in a 10 per cent suspension of chick embryo tissue. The suspension is well mixed and is stored in a refrigerator until the mixture no longer contains infectious virus detectable by any of the known methods. This is accomplished and the suspension is ready for use as a vaccine in five to seven days.

However, the suspension of vaccine may be purified in any one of a number of ways to yield a more potent product and one more easily handled. The active immunizing material can be precipitated and partially purified by the usual chemical methods utilized in the precipitation, concentration and purification of protein material. Another manner in which the immunizing material may be concentrated and purified with little loss in potency is by means of the ultracentrifuge. Any other suitable chemical and/or physical methods may be utilized for concentration and purification of the vaccine.

In tests with my vaccine for the immunization of various animals, I have found that the materials prepared in accordance with my process have shown a high degree of effectiveness. With guinea pigs of about 400-gram weight 1.0 cc. of vaccine prepared as described above was injected subcutaneously followed by a similar injection seven days after the first. These injections immunized the guinea pigs against enormous doses of infectious virus injected into the brain fourteen days or longer after the last injection of my vaccine. This has been done repeatedly and in no instance has a guinea pig receiving my vaccine been lost even when the infecting dose has been 1000 times the minimum fatal dose. In testing my vaccine on horses, I have also obtained definite immunity against many minimum fatal doses of virus injected intracerebrally.

My method of preparation of the vaccine is suitable for the eastern strain virus as well as the western strain virus. Apparently the vaccine prepared from embryos infected with eastern strain virus protects only against infection with eastern strain virus and vaccine from embryos diseased with western strain virus protects only against infection with western strain virus.

In place of the chick embryos specifically described I may utilize in my method the embryo of other fowl such as embryos of ducks, geese, turkeys, guinea-fowls, etc. However, chicken eggs are probably the cheapest and the most easily obtainable.

The exact age of the embryos is not of major importance. I have used nine to fourteen day old embryos with success.

The embryo may be inoculated with the virus in any suitable way other than that specifically described in the example. Thus the virus may be introduced into the embryo by intravenous injection, injection directly into the embryo itself or by some other suitable method. The time for incubation of the inoculated embryo may be varied somewhat although, for maximum yield, I have found it best to remove the embryo from the shell as near as possible to the time just before it dies.

In place of the sodium chloride solution used as a diluent, I may use other materials such as plain water or other types of diluting solutions. The concentration to which the ground embryo sap is diluted may be varied and likewise the concentration of formalin is not especially critical, at least not in principle. From a practical point of view and in order to obtain the maximum yield, the amount of formalin which is used should be sufficient to inactivate all of the active infectious virus but should not be sufficiently concentrated to destroy the immunizing capacity of the vaccine against the active infectious virus. In place of formalin inactivation I may utilize other chemical or physical methods such as light, heat, etc. The time of inactivation is not necessarily fixed but may easily be determined under any given circumstances.

The active infectious virus of either the eastern or western strain is obtained from any suitable source such as horse brain, guinea pig or mouse brain, chick embryo tissues or any other tissues or materials containing infectious virus. This virus is customarily utilized as a suspension as a convenient form for infection of the embryo. To produce a suitable suspension the tissues containing the active virus may be ground with sand and diluted or made up with sodium chloride solution, hormone broth, or the like. The exact medium is not important so long as the inoculum is sterile with respect to bacteria and contains sufficient active virus to infect the embryo.

The above description has referred to a vaccine grown on the living developing whole chick embryo. The procedure would doubtless be equally applicable to virus cultures prepared from other forms of living embryo tissues.

Any other suitable changes or variations may be made in carrying out the process of my invention without departing from the spirit and scope except as defined in the appended claims.

I claim:

1. An equine encephalomyelitis vaccine composition comprising formalinized fowl embryo tissues which had been diseased with equine encephalomyelitis, said composition being capable of immunizing horses against equine encephalomyelitis without substantially inducing the disease.

2. An equine encephalomyelitis vaccine composition comprising inactivated fowl embryo tissue which had been diseased with equine encephalomyelitis, said composition being capable of immunizing horses against equine encephalomyelitis without substantially inducing the disease.

3. An equine encephalomyelitis vaccine composition comprising a formalinized suspension of fowl embryo tissue which had been diseased with equine encephalomyelitis, said composition being capable of immunizing horses against equine encephalomyelitis without substantially inducing the disease.

4. A process for the production of equine encephalomyelitis vaccine which comprises infecting living fowl embryo tissue with the infectious virus of equine encephalomyelitis, propagating the virus in the tissue, and inactivating the virus so propagated without substantially destroying the immunizing capacity of the resulting vaccine.

5. A process for the production of equine encephalomyelitis vaccine which comprises infecting a living fowl embryo with the infectious virus of equine encephalomyelitis, incubating the embryo until just prior to the death thereof whereby the virus is propagated, removing the embryo, chilling the embryo, extracting the embryo sap, and inactivating the infectious virus in the sap without substantial destruction of the immunizing capacity of the vaccine produced by the inactivation.

6. A process for the production of equine encephalomyelitis vaccine which comprises infecting a living fowl embryo with the infectious virus of equine encephalomyelitis, incubating the embryo until just prior to the death thereof whereby the virus is propagated, removing the embryo, chilling the embryo, grinding the embryo, suspending the ground embryo in a weak salt solution, and inactivating the virus by adding formaldehyde in amount sufficient for inactivation but insufficient to cause any substantial destruction of the immunizing capacity of the vaccine so produced.

JOSEPH W. BEARD.